Patented Oct. 27, 1925.

1,559,113

UNITED STATES PATENT OFFICE.

HERBERT N. McCOY, OF CHICAGO, ILLINOIS, ASSIGNOR TO LINDSAY LIGHT COMPANY, OF CHICAGO, ILLINOIS, A CORPORATION OF ILLINOIS.

MANUFACTURE OF TITANIUM SULFATE.

No Drawing. Application filed June 14, 1924. Serial No. 720,132.

*To all whom it may concern:*

Be it known that I, HERBERT N. McCOY, a citizen of the United States, residing at Chicago, in the county of Cook and State of Illinois, have invented a new and useful Improvement in Manufacture of Titanium Sulfate, of which the following is a specification.

This invention relates to the manufacture of titanium sulfate from the insoluble basic sulfate and will be fully understood from the following description thereof.

It has hitherto been customary to effect the conversion of basic titanium sulfate into soluble titanium (tetravalent) sulfate by long continued heating with concentrated sulfuric acid, say 95 to 98% strength. In order to effect the conversion a long continued heating, from 24 to 48 hours, is required.

It has now been found that the conversion of basic titanium sulfate into soluble titanic sulfate may be readily and quickly effected without external heating by replacing at least a part of the concentrated sulfuric acid ordinarily employed with fuming sulfuric acid containing an excess of at least 5% $SO_3$. Preferably commercial fuming sulfuric acid containing 20% excess $SO_3$ and commonly designated 120% fuming acid is employed.

In carrying out the reaction, basic titanium sulfate, generally containing such amounts of water as are retained in filter pressing it, is admixed with some concentrated sulfuric acid, the proportion used being materially less than that required for the formation of the sulfate. Fuming sulfuric acid containing at least 5% excess $SO_3$, and preferably 20%, is then added in quantities at least sufficient to convert all of the titanium to $Ti(SO_4)_2$. A vigorous reaction ensues with great evolution of heat, and the reaction is completed in a very short time, say 15 to 20 minutes, without the use of extraneous heat. A viscous, sirupy mass of titanium sulfate is formed, which may be readily dissolved in water.

If desired, the sulfuric acid may be omitted, and the fuming acid alone used. In general, it is preferred that the quantity of fuming acid used shall be at least equal to the quantity of concentrated acid used when the basic sulfate employed contains not over 50% of moisture. As is readily apparent, the relative proportions of concentrated and fuming acid may be widely varied, in general larger proportions of fuming acid being advantageous with higher moisture content of the basic sulfate.

The following specific example illustrates the manner in which the invention may be carried out:

One hundred pounds of precipitated basic titanium sulfate, containing about 50% moisture, are mixed with 50 pounds concentrated sulfuric acid (about 95%), and about 60 pounds of fuming sulfuric acid containing about 20% excess $SO_3$ are then immediately run in. The reaction proceeds vigorously, and in about 15 or 20 minutes is complete, a sirupy mass of soluble titanium sulfate being formed.

I claim:

1. The method of forming soluble titanic sulfate consisting in reacting upon basic titanium sulfate with fuming sulfuric acid.

2. The method of forming soluble titanic sulfate consisting in mixing basic titanium sulfate with concentrated sulfuric acid and adding thereto fuming sulfuric acid, the total quantity of concentrated and fuming acids being sufficient to supply the acid required to form titanic sulfate.

3. The method of forming soluble titanic sulfate consisting in reacting upon basic titanium sulfate with fuming sulfuric acid in the presence of water.

4. The method of forming soluble titanic sulfate consisting in mixing moisture containing basic titanium sulfate with concentrated sulfuric acid and adding thereto fuming sulfuric acid.

HERBERT N. McCOY.